United States Patent
Wang et al.

(10) Patent No.: US 10,976,983 B2
(45) Date of Patent: Apr. 13, 2021

(54) SMART COLLABORATION ACROSS MULTIPLE LOCATIONS

(71) Applicant: International Business Machines Corporation, Armonk, NY (US)

(72) Inventors: Der-Joung Wang, New Taipei (TW); David Shao Chung Chen, Taipei (TW); Lilian Lai, Taipei (TW); Louis Huang, Taipei (TW); Wei-Te Chiang, Taipei (TW); Molly Chang, Taipei (TW); Po-Hsun Tseng, New Taipei (TW); Kuo-Liang Chou, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/364,226

(22) Filed: Mar. 26, 2019

(65) Prior Publication Data

US 2020/0310737 A1    Oct. 1, 2020

(51) Int. Cl.
 *G06F 3/14* (2006.01)
(52) U.S. Cl.
 CPC .......... *G06F 3/1454* (2013.01); *G06F 3/1462* (2013.01); *G06F 3/1415* (2013.01)
(58) Field of Classification Search
 None
 See application file for complete search history.

(56) References Cited

U.S. PATENT DOCUMENTS

| | | | |
|---|---|---|---|
| 7,129,934 B2 | 10/2006 | Luman | |
| 7,616,208 B2 * | 11/2009 | Lauder | H04N 7/15 345/530 |
| 8,244,233 B2 | 8/2012 | Chang | |
| 8,271,887 B2 | 9/2012 | Offer | |
| 8,644,620 B1 * | 2/2014 | Lam | G06F 13/10 382/209 |
| 9,300,912 B2 | 3/2016 | Taneja | |
| 9,412,174 B2 | 8/2016 | Somasundaram | |
| 9,479,548 B2 | 10/2016 | Jensen | |
| 9,575,712 B2 | 2/2017 | Farouki | |
| 9,706,102 B1 * | 7/2017 | McInerny | G06F 21/36 |
| 10,019,782 B2 * | 7/2018 | Yeo | G06F 3/0346 |
| 2002/0073160 A1 | 6/2002 | Purcell | |
| 2005/0174547 A1 * | 8/2005 | Yamaguchi | G06F 3/1454 353/122 |
| 2005/0180631 A1 | 8/2005 | Zhang | |

(Continued)

FOREIGN PATENT DOCUMENTS

CN    202771397 U    3/2013

OTHER PUBLICATIONS

Carl, "We've Tested the Best Online Whiteboards for Virtual Teams—the Results are in!", Distant Job, 3 pages, <https://distantjob.com/blog/2017-09-14-we-ve-tested-the-best-online-whiteboards-for-virtual-teams-the-results-are-in/>.

(Continued)

*Primary Examiner* — Patrick N Edouard
*Assistant Examiner* — Peijie Shen
(74) *Attorney, Agent, or Firm* — Alexander G. Jochym

(57) ABSTRACT

In an approach for smart collaboration, a plurality of images are received. Each image of the plurality of images is from a different device of a plurality of devices. The plurality of images are combined into a single combined image. The combined image is transferred to the plurality of devices.

17 Claims, 4 Drawing Sheets

(56) References Cited

U.S. PATENT DOCUMENTS

| | | | |
|---|---|---|---|
| 2007/0150924 A1* | 6/2007 | Ichinose | G06F 3/1454 725/78 |
| 2009/0285506 A1* | 11/2009 | Benson | G06F 3/1454 382/299 |
| 2011/0115701 A1* | 5/2011 | Kumagai | H04L 67/10 345/156 |
| 2012/0141038 A1* | 6/2012 | Horio | H04N 19/507 382/232 |
| 2012/0213404 A1* | 8/2012 | Steiner | G06F 16/5838 382/103 |
| 2012/0320158 A1* | 12/2012 | Junuzovic | G06Q 10/101 348/46 |
| 2013/0027404 A1* | 1/2013 | Sarnoff | G09G 5/14 345/441 |
| 2013/0236156 A1* | 9/2013 | Ueda | G11B 27/36 386/230 |
| 2014/0092121 A1* | 4/2014 | Robinson | G06F 3/1454 345/592 |
| 2014/0282077 A1 | 9/2014 | Wilson | |
| 2014/0297646 A1 | 10/2014 | Bastiaens | |
| 2015/0002435 A1* | 1/2015 | Shimizu | G06F 3/04883 345/173 |
| 2015/0012843 A1* | 1/2015 | Ouyang | H04L 65/403 715/753 |
| 2015/0149929 A1 | 5/2015 | Shepherd | |
| 2016/0198068 A1* | 7/2016 | Makar | H04N 21/4363 348/518 |
| 2016/0350057 A1* | 12/2016 | Kwon | G06F 3/04845 |
| 2016/0357720 A1* | 12/2016 | Thimbleby | G06F 3/0484 |
| 2017/0090851 A1* | 3/2017 | Takano | G02B 27/0101 |
| 2017/0235537 A1* | 8/2017 | Liu | H04L 67/18 715/759 |
| 2017/0293389 A1* | 10/2017 | Itakura | G06F 3/04886 |
| 2019/0121595 A1* | 4/2019 | Anderson | G09G 5/373 |
| 2019/0260966 A1* | 8/2019 | Leatherman, III | G06F 3/1454 |
| 2020/0034106 A1* | 1/2020 | Jain | H04L 29/06034 |
| 2020/0076862 A1* | 3/2020 | Eliason | H04M 3/567 |

OTHER PUBLICATIONS

Stewart, "The 18 Best Tools for Online Collaboration", Mar. 7, 2017, Creative Bloq, 6 pages, <https://www.creativebloq.com/design/online-collaboration-tools-912855>.

* cited by examiner

SMART COLLABORATION ACROSS MULTIPLE LOCATIONS

BACKGROUND

The present invention relates generally to the field of data collaboration, and more particularly to data collaboration across multiple locations to exchange ideas.

A video projector or digital image projector receives video signals from a source and projects the digital image on to a viewing surface, generally a screen. The image is projected using a lens system that uses either a light that is very bright or a laser. Video projects can be used in an office setting, home cinema, classroom presentation, or other location where video is to be displayed. There are multiple forms of video projectors including, but not limited to, DLP, LCD, LED, laser diode, LCoS, and the like.

A digital whiteboard, also known as an interactive whiteboard, is generally a large interactive display that can both display information and also receive input from a user directly on the screen. The interactive whiteboard can be a standalone device such as a touchscreen computer or can work with other devices, such as an input device and a video projector. Similar to the video projector, a digital whiteboard can be used in an office setting, home cinema, classroom presentation, or other location where video is to be displayed and interacted with. Often the user will interact with the information displayed by the projector or on the touchscreen by using his/her hands to touch the information, by using an input device such as an electronic pen that interacts directly with the physical surface of the digital whiteboard, or by using a mouse which can interact with the user interface being displayed.

SUMMARY

Embodiments of the present invention include a method, computer program product, and system for smart collaboration. In one embodiment, a plurality of images are received. Each image of the plurality of images is from a different device of a plurality of devices. The plurality of images are combined into a single combined display image. The combined image is transferred to the plurality of devices.

DETAILED DESCRIPTION

Collaborative working is common place throughout the world today. Often, users, individuals, or groups of users will interact with other users in another location. The second location may be a different room in the same building but often may be in an entirely different city, state, or even country. In this collaborative environment, users will use many different devices including, but not limited to, computers, touch pads, projectors, and/or digital whiteboards.

Embodiments of the present invention recognize that when users have ideas to discuss, especially users located at different locations, they exchange these ideas through collaborative work using devices to share notes found created on these devices. However, embodiments of the present invention recognize that, through this collaboration and exchange of ideas, there is not an easy way to exchange these notes from multiple locations. Embodiments of the present invention recognize that users at each location, while having their notes to display, cannot display the notes of their location and other locations in a single collaborative environment. Embodiments of the present invention recognize that there is no solution to displaying the multiple notes from multiple locations in a streamlined manner that prioritizes certain information and indicates which information comes from which location. Embodiments of the present invention recognize that users at each location may work on the same image or notes as users at another location.

Embodiments of the present invention provide for a display program 172 that modifies two or more images into a single image for display on a whiteboard. In embodiments of the present invention, the display program receives one or more images that are each being displayed at a location, analyzes and combines the images, and transfers the final combined image to the locations of the two or more images. In the case of a change of an image, the display program repeats these steps. This allows for collaboration between computing devices at different locations and allows for each location to view the images that are being created and modified at each location in a single master image that is easy to view.

Figure 1:
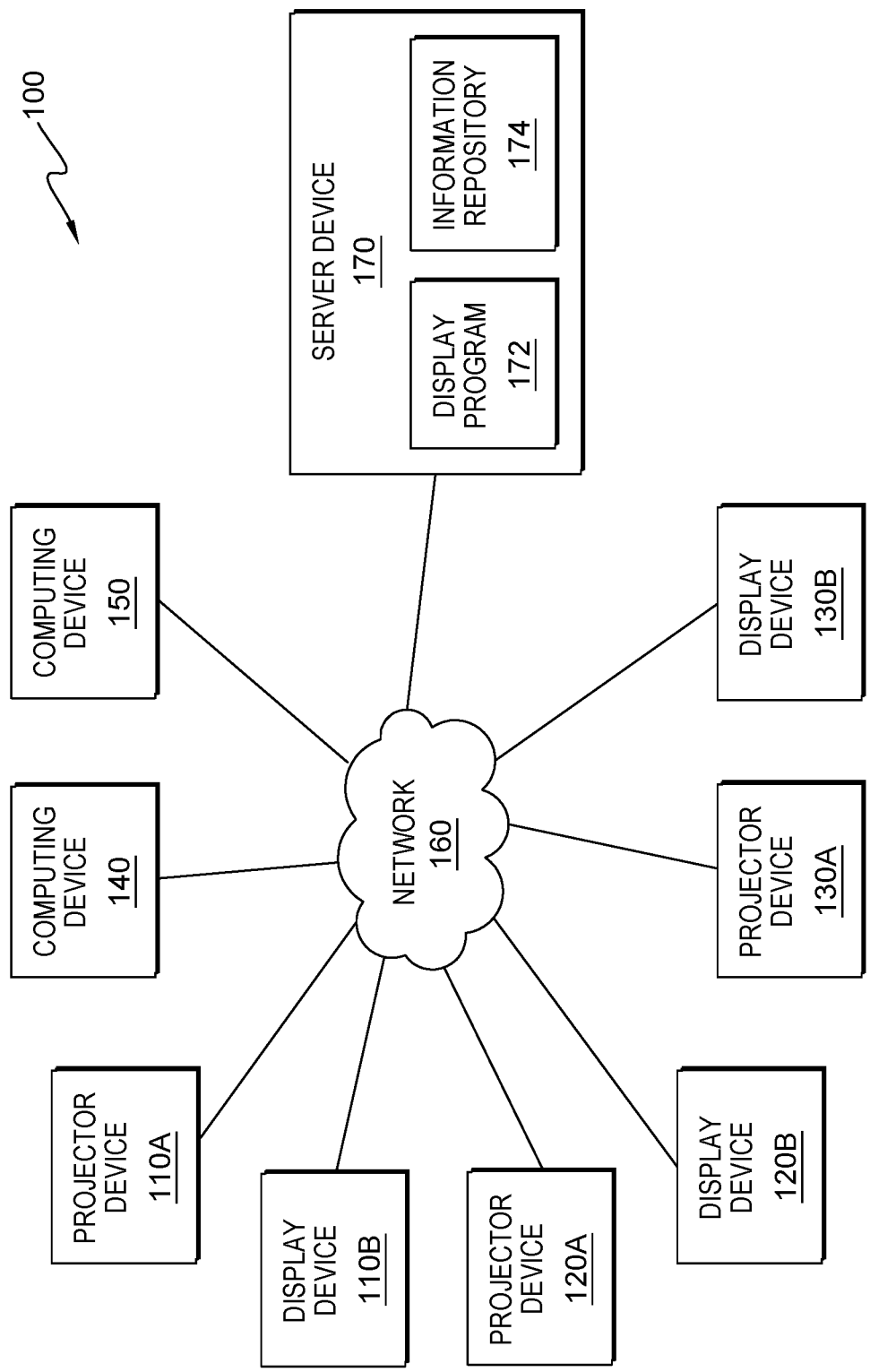
FIG. 1 is a functional block diagram of a network computing environment, generally designated 100, suitable for operation of display program 172 in accordance with at least one embodiment of the invention.

Referring now to various embodiments of the invention in more detail, FIG. 1 is a functional block diagram of a network computing environment, generally designated 100, suitable for operation of display program 172 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes projector device 110A, display device 110B, projector device 120A, display device 120B, projector device 130A, display device 130B, computing device 140, computing device 150, and server device 170 interconnected over network 160. Network 160 can be, for example, a local area network (LAN), a telecommunications network, a wide area network (WAN) such as the Internet, or any combination of the three, and include wired, wireless, or fiber optic connections. In general, network 160 can be any combination of connections and protocols that will support communications between projector device 110A, display device 110B, projector device 120A, display device 120B, projector device 130A, display device 130B, computing device 140, computing device 150, server device 170, and any other computer connected to network 160, in accordance with embodiments of the present invention.

In various embodiments of the invention, projector device 110A is a video projector or digital image projector that receives video signals from a source and projects the digital image on to a viewing surface, generally a screen. The image is projected using a lens system that uses either a light that is very bright or a laser. Projector device 110A can be used in an office setting, home cinema, classroom presentation, or other location where video is to be displayed. There are multiple forms of projector device 110A including, but not limited to, DLP (digital light projection), LCD (liquid-crystal display), LED (light-emitting diode), laser diode, LCoS (liquid crystal on silicon), or any combination of these technologies, and the like. In various embodiments, projector device 110A receives images for display from server device 170, via display program 172. In general, projector device 110A represents any programmable electronic device or combination of programmable electronic devices capable of executing machine readable program instructions and communicating with server device 170 and display program 172 within network computing environment 100 via a network, such as network 160.

In an embodiment of the invention, projector device 120A and projector device 130A are substantially similar to projector device 110A. In an embodiment, projector device 120A and projector device 130A may be in similar locations to each other or projector device 110A. In an alternative embodiment, projector device 120A and projector device 130A may be in different locations to each other and/or project device 110A. In an embodiment, network computing environment 100 may include any number of projector device 110A.

In various embodiments of the invention, display device 110B is a digital whiteboard, also known as an interactive whiteboard, that is generally a large interactive display which can both display information and also receive input from a user directly on the screen. Display device 110B can be a standalone device such as a touchscreen computer or can work with other devices such projector device 110A. Similar to projector device 110A, display device 110B can be used in an office setting, home cinema, classroom presentation, or other location where video is to be displayed and interacted with. Often the user will interact with the information displayed by display device 110B by using their hands to touch the information found on display device 110B, by using an input device such as an electronic pen that interacts directly with the physical surface of the display device 110B, or by using a mouse which can interact with the user interface being displayed on display device 110B.

In any embodiment of the invention, display device 110B may include a user interface. A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment of the invention, display device 120B and display device 130B are substantially similar to display device 110B. In an embodiment, display device 120B and display device 130B may be in similar locations to each other or display device 110B. In an alternative embodiment, display device 120B and display device 130B may be in different locations to each other and/or display device 110B. In an embodiment, network computing environment 100 may include any number of display device 110B.

In various embodiments of the invention, computing device 140 is a computing device that can be a standalone device, a management server, a web server, a media server, a mobile computing device, or any other programmable electronic device or computing system capable of receiving, sending, and processing data. In other embodiments, computing device 140 represents a server computing system utilizing multiple computers as a server system, such as in a cloud computing environment. In an embodiment, computing device 140 represents a computing system utilizing clustered computers and components (e.g. database server computers, application server computers, web servers, and media servers) that act as a single pool of seamless resources when accessed within network computing environment 100. In general, computing device 140 represents any programmable electronic device or combination of programmable electronic devices capable of executing machine readable program instructions and communicating with server device 170 and display program 172 within network computing environment 100 via a network, such as network 160.

In an embodiment, computing device 140 is a virtual whiteboard that includes software that allows computing device 140 to function similar to a digital whiteboard. Often the user will interact with the information displayed on computing device 140 by using their hands to touch the information found on computing device 140, by using an input device such as an electronic pen that interacts directly with the physical surface of the computing device 140, or by using a mouse which can interact with the user interface being displayed on computing device 140.

In any embodiment of the invention, computing device 140 may include a user interface. A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. For example, client application may be a web browser, a database program, etc.

In an embodiment of the invention, computing device 150 is substantially similar to computing device 140. In an embodiment, computing device 150 may be in a similar location to computing device 140. In an alternative embodiment, computing device 150 may be in different locations to computing device 140. In an embodiment, network computing environment 100 may include any number of computing device 140. Computing device 140 and computing device 150 may include internal and external hardware components, as depicted and described in further detail with respect to FIG. 4.

Server device 170 includes display program 172 and information repository 174. Although display program 172 and information repository 174 are depicted in FIG. 1 as being integrated with server device 170, in alternative embodiments, display program 172 and information repository 174 may be remotely located from server device 170. For example, display program 172 can be integrated with another computing device (not shown) connected to network 160. Server device 170 may include internal and external hardware components, as depicted and described in further detail with respect to FIG. 4.

Embodiments of the present invention provide for display program 172 that modifies two or more images into a single image for display on a whiteboard. In embodiments of the present invention, display program 172 receives two or more images that are each being displayed at a location. Display program 172 analyzes the images to determine which part of the images should be included in a single final image. Display program 172 stores the analyzed images. Display program 172 combines the images into a single combined display image. Display program 172 then transmits the single combined display image to the locations of the original two or more images for display on a digital whiteboard. Display program 172 then determines if there is a change to any of the images. If there is, display program 172 then analyzes the images again and repeats the following steps.

In an embodiment, server device 170 includes information repository 174. In an embodiment, information repository 174 may be managed by display program 172. In an alternative embodiment, information repository 174 may be managed by the operating system of the device, alone, or together with, display program 172. Information repository 174 is a data repository that can store, gather, compare, calculate, combine and/or analyze information. In some embodiments, information repository 174 is located externally to server device 170 and accessed through a communication network, such as network 160. In some embodiments, information repository 174 is stored on server device 170. In some embodiments, information repository 174 may reside on another computing device (not shown), provided that information repository 174 is accessible by server device 170. Information repository 174 includes, but is not limited to, images that are received by display program 172 from one or more locations, and a single combined display image that is created by display program 172.

Information repository 174 may be implemented using any volatile or non-volatile storage media for storing information, as known in the art. For example, information repository 174 may be implemented with a tape library, optical library, one or more independent hard disk drives, multiple hard disk drives in a redundant array of independent disks (RAID), solid-state drives (SSD), or random-access memory (RAM). Similarly, information repository 174 may be implemented with any suitable storage architecture known in the art, such as a relational database, an object-oriented database, or one or more tables.

Figure 2:
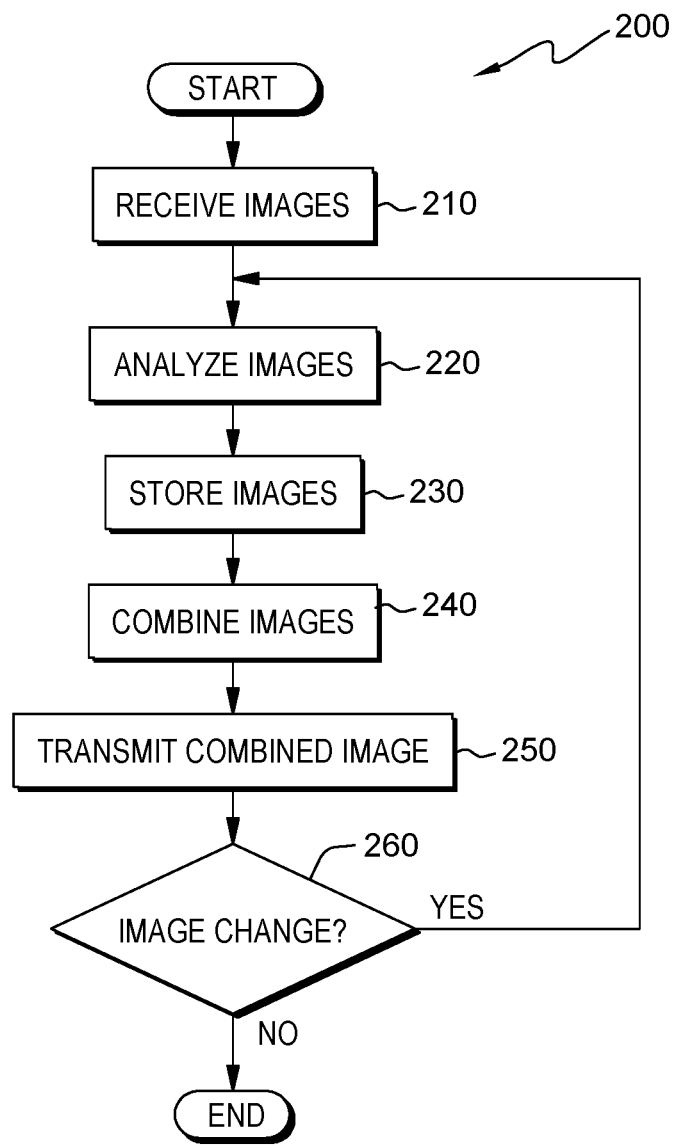
FIG. 2 is a flow chart diagram depicting operational steps for display program 172 in accordance with at least one embodiment of the invention.
Figure 3:
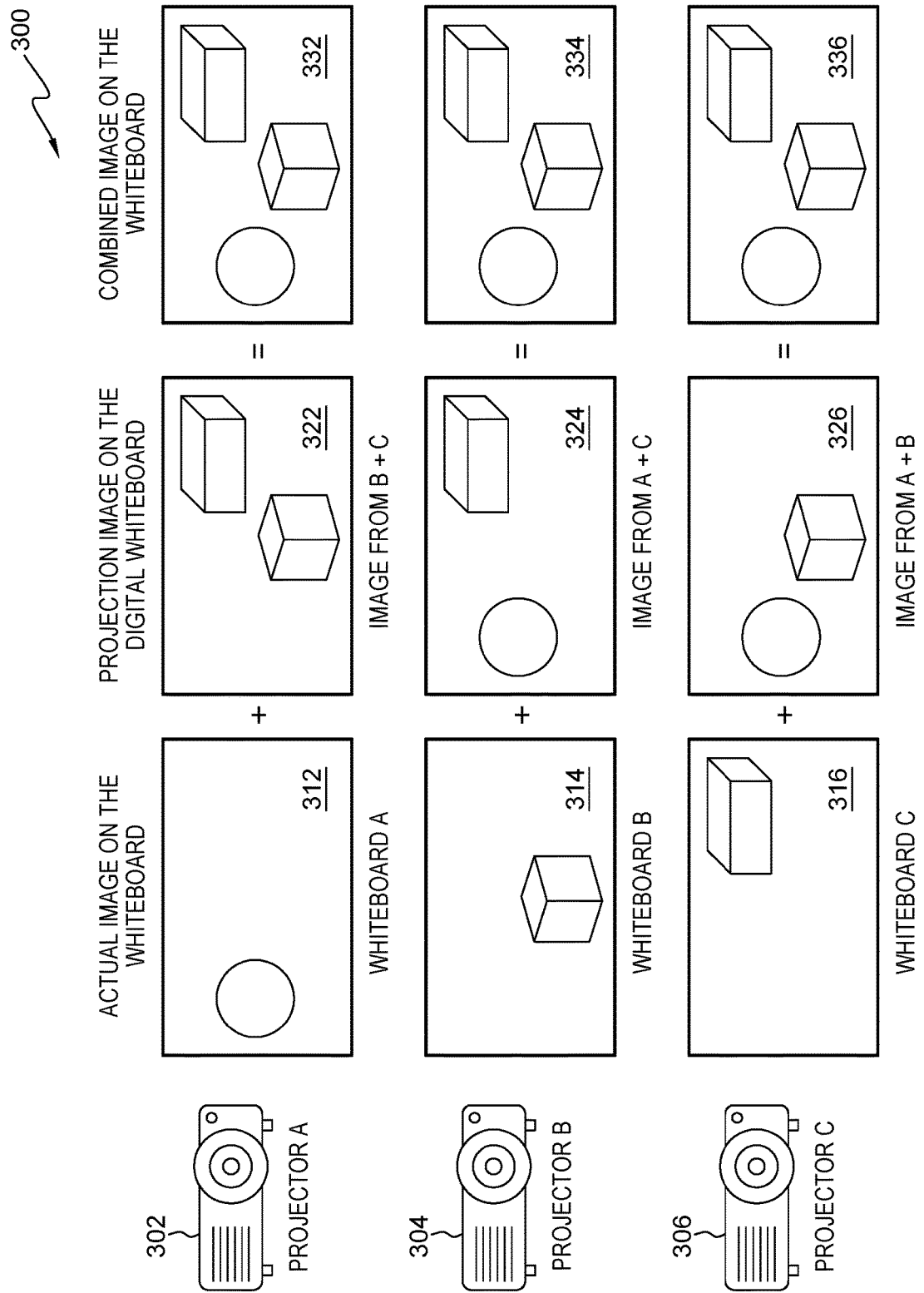
FIG. 3 is an example of image projection from multiple locations in accordance with at least one embodiment of the invention.

FIG. 2 is a flow chart diagram of workflow 200 depicting operational steps for display program 172 in accordance with at least one embodiment of the invention. In an alternative embodiment, the steps of workflow 200 may be performed by any other program while working with display program 172. It should be appreciated that embodiments of the present invention provide at least for displaying multiple images from multiple locations on the same system, such as projector device 110A, display device 110B, projector device 120A, display device 120B, projector device 130A, display device 130B, and computing device 140 to a single computing system, such as computing device 150. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface discussed previously, can invoke workflow 200 upon a user wanting display program 172 to create an environment that displays multiple images from multiple locations on the same system.

Display program 172 receives images (step 210). At step 210, display program 172 receives one or more images. In an embodiment, the one or more images are images created and/or modified by a user on his/her device and transmitted to display program 172 in order to be displayed to all other users that are interacting in a collaborative environment. In some embodiments, the one or more images may be from different locations. For example, display device 110B located at location A may transmit an image to display program 172, display device 120B located at location B may transmit an image to display program 172, and computing device 140 located at location C may transmit an image to display program 172. In some embodiments, the one or more images may be from multiple devices, but the locations of the devices may be the same. For example, display device 110B located at location A may transmit an image to display program 172, display device 120B located at location B may transmit an image to display program 172, computing device 140 located at location B may transmit an image to display program 172, and computing device 150 located at location C may transmit an image to display program 172. In this example, display device 120B may be in the same location (i.e. conference room) as computing device 140, however display device 120B may be used by a first user and computing device 140 may be used by a second user. In an embodiment, each image includes metadata that indicates which location and/or device the image is being transferred from. In an embodiment, the metadata may also include information about the program(s) that are being used to display the image on the device, the operating system being used on the device, or any other programs that are running on the device and being displayed in the image and time-stamp information about the image. In an embodiment, each of the images received from the locations may be the same images, however, some or all of the images may have small changes to the image based on input by a user at each of the locations.

Display program 172 analyzes images (step 220). At step 220, display program 172 analyzes each image received. In other words, display program 172 determines which parts of the images are needed to be used in a combined image from all images received. In an embodiment, an image may include the entire display screen of the computing device and display program 172 determines which part of the image is used for the collaborative environment and which part of the image is part of the user interface of the display screen. For example, display program 172 receives an image and determines that part of the image is the operating system, part of the image is the program being used to display the image, and the remaining image is what is needed. In this embodiment, display program 172 uses the metadata associated with the image to determine the operating system and programs running on the device the image is coming from. In an embodiment, display program 172 then uses known imaging analysis programs to determine what the operating system user interface and user interface of the programs on the device look like, compares them to the image received, and determines what parts of the image are being shared and what parts of the image are user interface and not needed. In an alternative embodiment, a user on the device that the image is being transferred from may outline or indicate which part of the image is relevant and should be used and which part of the image is not needed.

In some embodiments, display program 172, in the case of a previously received image from a device, may compare the newly received image to the stored previously received image to determine differences and/or changes between the previously received image and the newly received image.

In an embodiment, when display program 172 analyzes the images, display program 172 may determine that there are changes to previously received images. In an example, two images may be received from two devices. In this example, the images are the same images, however, they each have small changes that overlap a same location on a previously sent single combined display image (i.e. wording in the first image from the first location has changed to "Hello" and the wording in the second image from the second location has changed to "Howdy") and each of the changes were done separately by the users of each device. Here, display program 172 will determine the time stamp of each of the changes. In a first embodiment, the changes may be determined to be done in a time difference between the changes that is less than a pre-determined threshold. In other words, the difference between the time that the first change is done and the second change is done is less than a threshold. In this embodiment, display program 172 determines that the overlapping of the changes was unintentional. In this embodiment, display program 172 will separate the two objects and use a form of identification (i.e., dotted lines, etc.) to indicate each different object and/or the device/location the object is from. In this embodiment, display program 172 will indicate (i.e., by blinking, etc.) if there is not enough room in the single combined display image to display both objects. In a second embodiment, the changes may be determined to be done in a time difference greater than a pre-determined threshold. In this embodiment, display program 172 determines that the overlapping of the changes was intentional and will use the newer received image to create the single combined display image, discussed below.

Display program 172 stores images (step 230). At step 230, display program 172 stores the analyzed images. In embodiments of the invention, display program 172, when storing the analyzed image, includes the timestamp of the image. In an embodiment, display program 172 stores the images in information repository 174. In an alternative embodiment, display program 172 stores the images in a storage device accessible to display program 172 via network 160.

Display program 172 combines images (step 240). At step 240, display program 172 generates a single combined display image that may include the images received in step 210 and may include images previously received. In an embodiment, display program 172 combines the images received into a single combined display image. In an embodiment, display program 172 combines the images received in a manner that reduces the amount of "white" or blank space on the single combined display image. In an alternative embodiment, based on the number of received images, display program 172 may parse the single combined display image into equal sized parts based on the number of received images, and each received image is placed into an equal part of the single combined display image. For example, if display program 172 receives four images, display program 172 parses the single combined display image, in this case a square display image, into four equal sized square pieces, where the single combined display image is split in half both horizontally and vertically, and each received image is placed into a quadrant (i.e. one of the four equal sized square pieces) of the single combined display image.

In an alternative embodiment, display program 172 may create a single combined display image that emphasizes a single image over other images, the "primary" image. In this embodiment, display program 172 determines a "primary" image based on user input or metadata associated with the images that indicates that one of the images is to be the focus of the single combined display image over the other images that are received. In this embodiment, the "primary" image may be found in the center of the single combined display image. In this embodiment, the "primary" image may be larger in size on the single combined display image relative to the sizing of the other images to be also included in the single combined display image. In this example, the image of a single user may be the "primary" image and the image of other users are "auxiliary" images that are placed around the "primary" image. In this example, the "primary" image has more emphasis and the "auxiliary" images are deemphasized by either location, size, or both relative to the "primary" image.

In an alternative embodiment, display program 172 may generate multiple single combined display images. In each of the multiple single combined display images, display program 172 emphasizes a single image over other images, the "primary" image. The remaining images will be "auxiliary" images that are placed around the "primary" image. In this embodiment, the "primary" image for each of the multiple single combined display images, is the image received from the location that the single combined display image will be transferred to. For example, three images are received, Image A, Image B, and Image C, from three locations, Location A, Location B, and Location C. Here, Image A is from Location A, Image B is from Location B, and Image C is from Location C. When display program 172 creates the single combined display image for Location A, Image A will be the "primary" image and Image B and Image C will be the "auxiliary" images that are placed around Image A. Furthering the example, when display program 172 creates the single combined display image for Location B, Image B will be the "primary" image and Image A and Image C will be the "auxiliary" images.

In an embodiment, display program 172 may add additional information to the single combined display image. In an embodiment, this additional information may include a key that outlines indications that show information is from one location or another location. In an embodiment, the indications may be different color lines for each location. For example, a blue box around a part of the single combined display image may indicate the information is from Location A and a red box around a part of the single combined display image may indicate the information is from Location B. In an alternative embodiment, the indications may be different line shading and/or dashing. For example, a thin line around a part of the single combined display image may indicate the information is from Location A and a thick around a part of the single combined display image may indicate the information is from Location B. In an alternative example, a single dashed line around a part of the single combined display image may indicate the information is from Location A and a double dashed line around a part of the single combined display image may indicate the information is from Location B. In another embodiment, display program 172, based on a determination that there are changes to the single combined display image as compared to a previously sent single combined display image, may indicate the changes from the previously sent version. For example, different line shading, dashing or coloring may be indicated around changes between previous versions of the single combined display image.

In an embodiment, display program 172 may overlap content to make the single combined display image. In this embodiment, the single combined image may overlap images in order to display all of the images in the single combined image. In an alternative embodiment, display program 172 may choose not to overlap any content in the single combined display image. In this alternative embodiment, each image may have a form of identification around each image to make each image distinct from others, for example, by using dotted lines. In an embodiment, display program 172 may cause the single combined display image to blink on users' screens when there is not enough space to display all of the images in a single combined display image.

Display program 172 transmits combined images (step 250). At step 250, display program 172 transmits the single combined display image to each of the devices that display program 172 received images from. In an embodiment, each device receives the same single combined display image. In an alternative embodiment, in the case of multiple single combined display images that are created specifically for a location, display program 172 transmits the corresponding single combined display image to the correct location. In an embodiment, display program 172 may transmit the single combined display image to a device that did not submit an initial image.

Display program 172 determines an image change (decision step 260). At decision step 260, display program 172 receives a new image from a device that display program 172 has previously received an image from. In an embodiment, display program 172 retrieves the previously received image that was stored in step 230. In an embodiment, display program 172 compares the newly received image to the previously received image to determine any differences between the images. In an embodiment, if display program 172 determines there are any differences or image changes between the newly received image and the previously received image (decision step 260, "Yes" branch), display program 172 analyzes the newly received image (step 220). In an embodiment, if display program 172 determines there are no differences or image changes between the newly received image and the previously received image (decision step 260, "No" branch), display program 172 ends processing.

FIG. 3 depicts an example of image projection from multiple locations in accordance with at least one embodiment of the invention. In the example, FIG. 3 includes an example 300 of three projectors, three images, and three digital whiteboards displaying those images. Further, projector A 302, projector B 304 and projector C 306 are substantially similar to projector device 110A, projector device 120A and projector device 130A. In an alternative example, projector A 302 may instead be a display of a computing device substantially similar to computing device 140 and computing device 150. Here, whiteboard A 312 includes the image (i.e., the circle) that is projected by projector A 302 onto whiteboard A 312. Additionally, whiteboard B 314 includes the image (i.e., the square cube) that is projected by projector B 304 onto whiteboard B 314. Finally, whiteboard C 316 includes the image (i.e., the rectangular cube) that is projected by projector C 306 onto whiteboard C 316. Furthering this example, display program 172 analyzes the received images and determines which images need to be added to create the final image to be sent to all the projectors. Here, image 322 includes the images from projector B 304 and project C 306. Image 324 includes the images from projector A 302 and projector C 306. Image 326 includes the images from projector A 302 and projector B 304. Display program 172 then combines all three images from projector A 302, projector B 304, and projector C 306 and transmits the final image to the projectors to be displayed on each respective whiteboard as image 332, image 334, and image 336.

Figure 4:
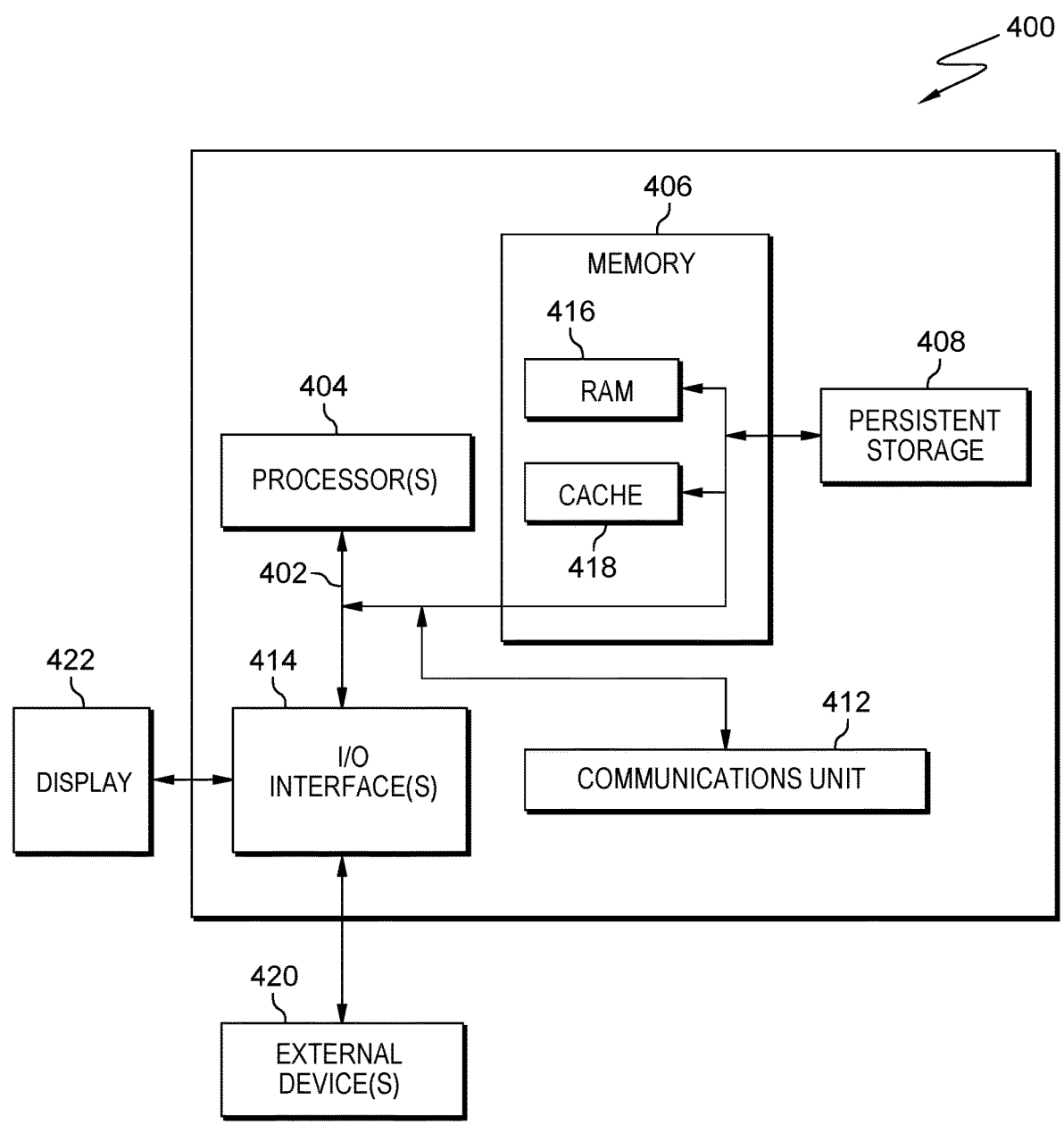
FIG. 4 is a block diagram depicting components of a computer, generally designated 400, suitable for executing display program 172 in accordance with at least one embodiment of the invention.

FIG. 4 is a block diagram depicting components of a computer 400 suitable for display program 172, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions for display program 172 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for smart collaboration, the computer-implemented method comprising the steps of:
    receiving, by one or more computer processors, a plurality of images, wherein each image of the plurality of images is from a different device of a plurality of devices;
    combining, by one or more computer processors, the plurality of images into a single combined image;
    transferring, by one or more computer processors, the single combined image to the plurality of devices;
    receiving, by one or more computer processors, a first image from a first device of the plurality of devices;
    receiving, by one or more computer processors, a second image from a second device of the plurality of devices;
    determining, by one or more computer processors, whether there is a difference between the first image, the second image, and the single combined image at a first location;
    responsive to determining the first image, the second image, and the single combined image have a difference at the first location, comparing, by one or more computer processors, a difference between a timestamp of the first image and a timestamp of the second image; and
    responsive to the difference being less than a threshold, combining, by one or more computer processors, the difference between the first image and the single combined image, the difference between the second image and the single combined image, in the single combined image, wherein the difference between the first image and the single combined image and the difference between the second image and the single combined image are not placed at a same location in the single combined image.

2. The computer-implemented method of claim 1, further comprising:
    responsive to the difference being greater than a threshold, combining, by one or more computer processors, the first image at the first location and the second image at the first location into the single combined image at the first location, wherein the first location is the same relative location in the first image, the second image, and the single combined image.

3. The computer-implemented method of claim 1, wherein the difference between the first image and the single combined image is surrounded by dotted lines in the single combined image and the difference between the second image and the single combined image is surrounded by dotted lines in the single combined image.

4. The computer-implemented method of claim 1, wherein at least one device of the plurality of devices is a digital whiteboard.

5. The computer-implemented method of claim 1, further comprising:
    receiving, by one or more computer processors, a first image from a first device of the plurality of devices;
    combining, by one or more computer processors, the first image and the single combined image into a second single combined image;
    transferring, by one or more computer processors, the second combined image to the plurality of devices.

6. The computer-implemented method of claim 1, wherein each device of the plurality of devices is in a different physical location.

7. A computer program product for smart collaboration, the computer program product comprising:
    one or more computer readable storage media; and
    program instructions stored on the one or more computer readable storage media, the program instructions comprising:
    program instructions to receive a plurality of images, wherein each image of the plurality of images is from a different device of a plurality of devices;
    program instructions to combine the plurality of images into a single combined image;
    program instructions to transfer the single combined image to the plurality of devices;
    program instructions to receive a first image from a first device of the plurality of devices;
    program instructions to receive, a second image from a second device of the plurality of devices;
    program instructions to determine whether there is a difference between the first image, the second image, and the single combined image at a first location;
    responsive to determining the first image, the second image, and the single combined image have a difference at the first location, program instructions to compare a difference between a timestamp of the first image and a timestamp of the second image; and
    responsive to the difference being less than a threshold, combine the difference between the first image and the single combined image, the difference between the second image and the single combined image, in the single combined image, wherein the difference between the first image and the single combined image and the difference between the second image and the single combined image are not placed at a same location in the single combined image.

8. The computer program product of claim 7, further comprising program instructions, stored on the one or more computer readable storage media, to:

responsive to the difference being greater than a threshold, combine the first image at the first location and the second image at the first location into the single combined image at the first location, wherein the first location is the same relative location in the first image, the second image, and the single combined image.

9. The computer program product of claim 7, wherein the difference between the first image and the single combined image is surrounded by dotted lines in the single combined image and the difference between the second image and the single combined image is surrounded by dotted lines in the single combined image.

10. The computer program product of claim 7, wherein at least one device of the plurality of devices is a digital whiteboard.

11. The computer program product of claim 7, further comprising program instructions, stored on the one or more computer readable storage media, to:
receive a first image from a first device of the plurality of devices;
combine the first image and the single combined image into a second single combined image;
transfer the second combined image to the plurality of devices.

12. The computer program product of claim 7, wherein each device of the plurality of devices is in a different physical location.

13. A computer system for smart collaboration, the computer system comprising:
one or more computer processors;
one or more computer readable storage media; and
program instructions, stored on the one or more computer readable storage media for execution by at least one of the one or more computer processors, the program instructions comprising:
program instructions to combine the plurality of images into a single combined image;
program instructions to transfer the single combined image to the plurality of devices;
program instructions to receive a first image from a first device of the plurality of devices;
program instructions to receive, a second image from a second device of the plurality of devices;
program instructions to determine whether there is a difference between the first image, the second image, and the single combined image at a first location;
responsive to determining the first image, the second image, and the single combined image have a difference at the first location, program instructions to compare a difference between a timestamp of the first image and a timestamp of the second image; and
responsive to the difference being less than a threshold, combine the difference between the first image and the single combined image, the difference between the second image and the single combined image, in the single combined image, wherein the difference between the first image and the single combined image and the difference between the second image and the single combined image are not placed at a same location in the single combined image.

14. The computer system of claim 13, further comprising program instructions, stored on the one or more computer readable storage media for execution by at least one of the one or more computer processors, to:
responsive to the difference being greater than a threshold, combine the first image at the first location and the second image at the first location into the single combined image at the first location, wherein the first location is the same relative location in the first image, the second image, and the single combined image.

15. The computer system of claim 13, wherein the difference between the first image and the single combined image is surrounded by dotted lines in the single combined image and the difference between the second image and the single combined image is surrounded by dotted lines in the single combined image.

16. The computer system of claim 13, wherein at least one device of the plurality of devices is a digital whiteboard.

17. The computer system of claim 13, further comprising program instructions, stored on the one or more computer readable storage media for execution by at least one of the one or more computer processors, to:
receive a first image from a first device of the plurality of devices;
combine the first image and the single combined image into a second single combined image;
transfer the second combined image to the plurality of devices.

\* \* \* \* \*